United States Patent
Tachikawa et al.

(10) Patent No.: US 7,352,357 B2
(45) Date of Patent: *Apr. 1, 2008

(54) DATA PROCESSING APPARATUS

(75) Inventors: Tadanori Tachikawa, Kawasaki (JP); Sonomasa Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

This patent is subject to a terminal disclaimer.

(21) Appl. No.: 11/134,781

(22) Filed: May 20, 2005

(65) Prior Publication Data

US 2005/0212792 A1    Sep. 29, 2005

Related U.S. Application Data

(63) Continuation of application No. 10/078,900, filed on Feb. 19, 2002, now Pat. No. 6,906,698.

(30) Foreign Application Priority Data

Sep. 18, 2001    (JP)    ............................ 2001-283798

(51) Int. Cl.
*G09G 5/00*    (2006.01)

(52) U.S. Cl. .................. 345/156; 345/168; 345/211; 345/901; 345/905; 200/51.09; 200/61.7; 361/616; 361/681; 361/683

(58) Field of Classification Search ................ 345/156, 345/184, 211, 901, 905; 348/373, 376, 788, 348/790, 794, 836; 455/347, 348; 361/683, 361/616; 710/48, 131; 200/51.09, 61.7, 200/61.71; 713/310, 320, 324
See application file for complete search history.

(56) References Cited

U.S. PATENT DOCUMENTS

| | | | |
|---|---|---|---|
| 5,077,551 A | 12/1991 | Saitou | |
| 5,592,362 A | 1/1997 | Ohgami et al. | |
| 6,011,544 A | 1/2000 | Sato | |
| 6,243,819 B1 * | 6/2001 | Jung | 713/320 |
| 6,492,974 B1 | 12/2002 | Nobuchi et al. | |
| 6,560,103 B1 | 5/2003 | Dohi et al. | |
| 6,642,462 B2 | 11/2003 | Ninomiya et al. | |

FOREIGN PATENT DOCUMENTS

| | | |
|---|---|---|
| EP | 0 943 979 A2 | 9/1999 |
| EP | 0 943 979 A3 | 10/2003 |
| JP | 10-268971 | 10/1998 |

* cited by examiner

Primary Examiner—Henry N Tran
(74) Attorney, Agent, or Firm—Greer, Burns & Crain, Ltd.

(57) ABSTRACT

A data processing apparatus includes a main body, a cover unit having a display such as an LCD, and a detecting mechanism for detecting the opening and closing of the cover unit in relation to the main body. The detecting mechanism includes a cam mounted coaxially to and rotating together with a pivot shaft that can rotate together with the cover unit, and a detecting switch mounted to the main body and directly or indirectly actuated by the action of the cam as the cover unit opens and closes to detect the opening and closing of the cover unit.

6 Claims, 5 Drawing Sheets

DATA PROCESSING APPARATUS

This is a continuation of application Ser. No. 10/078,900, filed Feb. 19, 2002 now U.S. Pat. No. 6,906,698.

BACKGROUND OF THE INVENTION

The present invention relates to a data processing apparatus and particularly to a data processing apparatus equipped with a detecting mechanism for detecting the opening and closing over a main body of a cover that has a display such as an LCD.

DESCRIPTION OF THE RELATED ART

Among a variety of data processing apparatuses including personal computers that have been improved in versatility is a portable data processing apparatus known as a lap-top computer arranged generally reduced in size and thickness for portable use.

Such a portable data processing apparatus comprises a main body including a CPU, a set of circuit boards, a keyboard and a cover unit hinged to the main body and having a liquid crystal display or any other display.

As its cover unit is closed to overlap (mate flush with) the main body, the data processing apparatus is highly portable. When the apparatus is in use, its cover unit is opened to such a position over the main body that the liquid crystal display can be viewed.

In the portable mode (where the cover unit is closed over the main body), the power supply to the liquid crystal display is automatically disconnected for energy saving of the battery and improvement of the operability. When the cover unit is opened, the liquid crystal display can automatically be energized. For the above mentioned power on-off purposes, the data processing apparatus includes a detecting mechanism for detecting the opening and closing of the cover unit.

FIGS. 1 and 2 illustrate a conventional data processing apparatus 1. The data processing apparatus 1 is of a known lap-top type consisting mainly of a main body 2 and a cover unit 3.

The main body 2 includes a cursor operator, a keyboard, a set of circuit boards (on which a CPU and other controllers are mounted), interfaces, and power sources. The cover unit 3 includes a liquid crystal display 8.

As explained previously, the portable data processing apparatus 1 has the cover unit 3 hinged to the main body 2 so that they are folded closed in the portable mode. When the data processing apparatus 1 is in use, its cover unit 3 is opened to such a position over the main body 2 that the liquid crystal display 8 can be viewed favorably.

The data processing apparatus 1 also includes a detecting mechanism 9 for energy saving of the battery and improvement of the operability. This allows the liquid crystal display 8 to be automatically de-energized when the cover unit 3 is closed directly over the main body 2.

Commonly, the detecting mechanism 9 comprises an actuator 13 mounted on the cover unit 3 and a detecting switch 10 mounted on the main body 2. As shown in FIG. 1, the actuator 13 extends from the inner wall 3a of the cover unit 3, or more precisely the lowermost part adjacent to the center of turning movement of the inner wall 3a. The detecting switch 10 is located with its switching knob 11 in an opening 12 which is provided in a cover member 7 of the main body 2.

When the cover unit 3 is closed, its actuator 13 moves into the opening 12 and presses against the switching knob 11. As a result, the detecting switch 10 is shifted from one of ON and OFF states to the other. Upon receiving an ON or OFF signal from the detecting switch 10, the detecting mechanism 9 detects the opening or closing of the cover unit 3. Accordingly, when the cover unit 3 is opened, the liquid crystal display 8 can automatically be energized. When the cover unit 3 is closed, the liquid crystal display 8 can automatically be de-energized.

It is however essential for the detecting mechanism 9 in the conventional data processing apparatus 1 to have the opening 12 provided in the cover member 7 of the base unit 2 so that the detecting switch 10 can be manipulated by the actuator 13 through the opening 12.

The opening 12 may allow dust or dirt to enter the main body 2 and accumulate directly on the electronic components or moving parts thus interrupting the proper action of the electronic components or moving parts. Also, as the actuator 13 is located close to the liquid crystal display 8 which is continuously viewed by the user, it may spoil the appearance of the apparatus.

SUMMARY OF THE INVENTION

The present invention has been developed in view of the foregoing aspects and its object is to provide a data processing apparatus that inhibits any dust or dirt from entering the data processing apparatus while improving its external appearance.

For eliminating the described disadvantages, the present invention offers novel means which are described below.

A data processing apparatus is provided comprising:

a main body on which a device for data processing is mounted;

a cover unit hinged to the main body for pivotal movement for opening and closing in relation to the main body; and a detecting mechanism for detecting the opening and closing of the cover unit, wherein the detecting mechanism includes a cam mounted coaxially to a pivot shaft that can rotate together with the cover unit thus to turn the cam, and a detecting switch mounted to the main body and arranged that can directly or indirectly be actuated by the action of the cam as the cover unit is opened and closed thus detecting the opening and closing of the cover unit.

This allows the opening and closing of the cover unit to be detected by the detecting switch directly or indirectly actuated with the cam which is driven as the cover unit is opened and closed. The cam for actuating the detecting switch is coaxially mounted to the pivot shaft about which the cover unit is rotated in relation to the main body and can thus be turned together with the pivot shaft.

Since the detecting switch is actuated by the action of the cam at one end of the pivot shaft, there is no need to provide an opening in the main body nor actuating portion on the inner wall of the cover unit. As a result, the apparatus can inhibit any dust or dirt from entering the data processing apparatus as well as improving its appearance.

The data processing apparatus may be modified in that a lever is provided between the cam and the detecting switch for transmitting a displacement of the cam to the detecting switch.

Since the lever located between the cam and the detecting switch is arranged to transmit the displacement of the cam to the detecting switch, its design (size, shape, location) can have a degree of freedom.

The data processing apparatus may be modified in that a cover member is provided in the main body for covering the detecting mechanism as well as internal components of the main body.

Since the detecting mechanism is protected with the cover member, which extends over the internal components in the main body, the number of the components and thus the overall cost of production can be significantly decreased as compared with a conventional arrangement using a separate covering member for protecting the detecting mechanism. Also, as the detecting mechanism is fully protected, it can be free from dust or dirt entering.

The data processing apparatus may be modified in that the detecting switch is arranged for energizing and de-energizing a display provided on the cover unit.

This allows the display to be automatically energized and de-energized in response to the opening and closing of the cover unit.

Other objects, features, and advantages of the present invention will be more apparent from the following detailed description when read in conjunction with the accompanying drawings.

DETAILED DESCRIPTION OF THE PREFERRED EMBODIMENTS

A description will now be given, with reference to the drawings, of embodiments of the present invention.

One embodiment of the present invention will be described in more detail referring to the relevant drawings.

Figure 1:
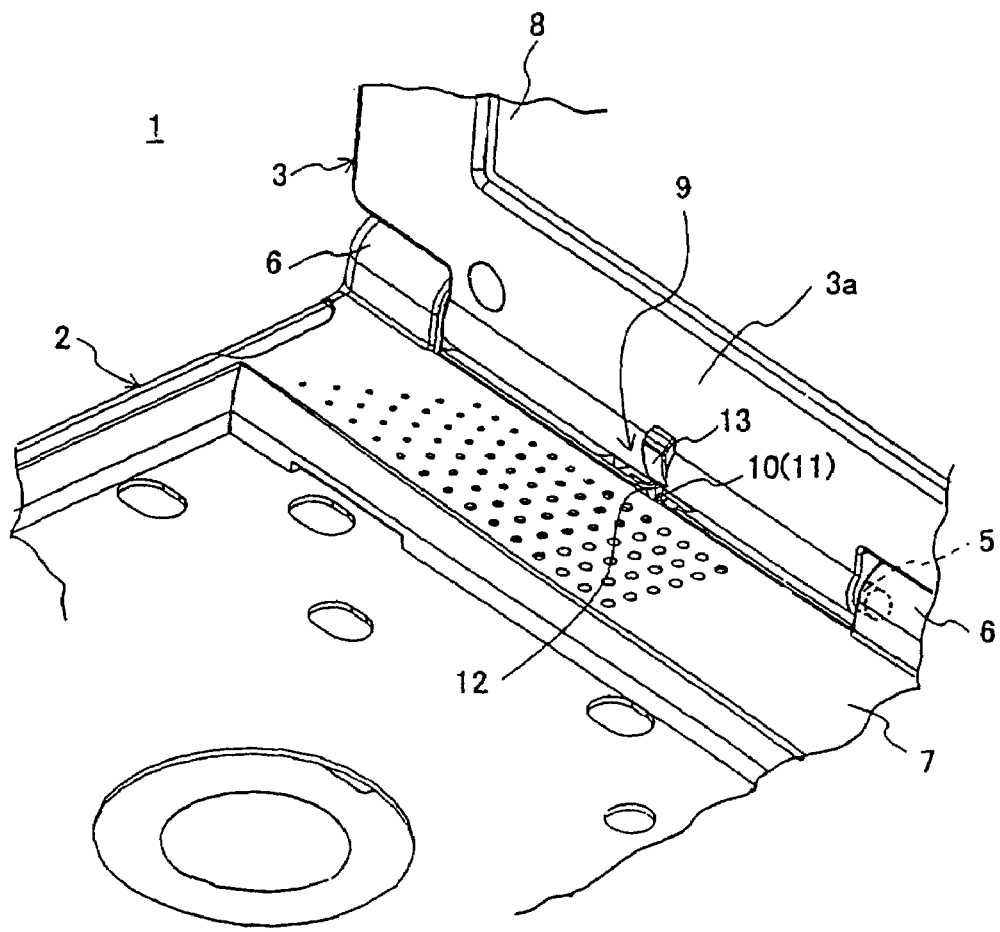
FIG. 1 is an enlarged perspective view of a detecting mechanism region of a data processing apparatus showing an example of the prior art.
Figure 2:
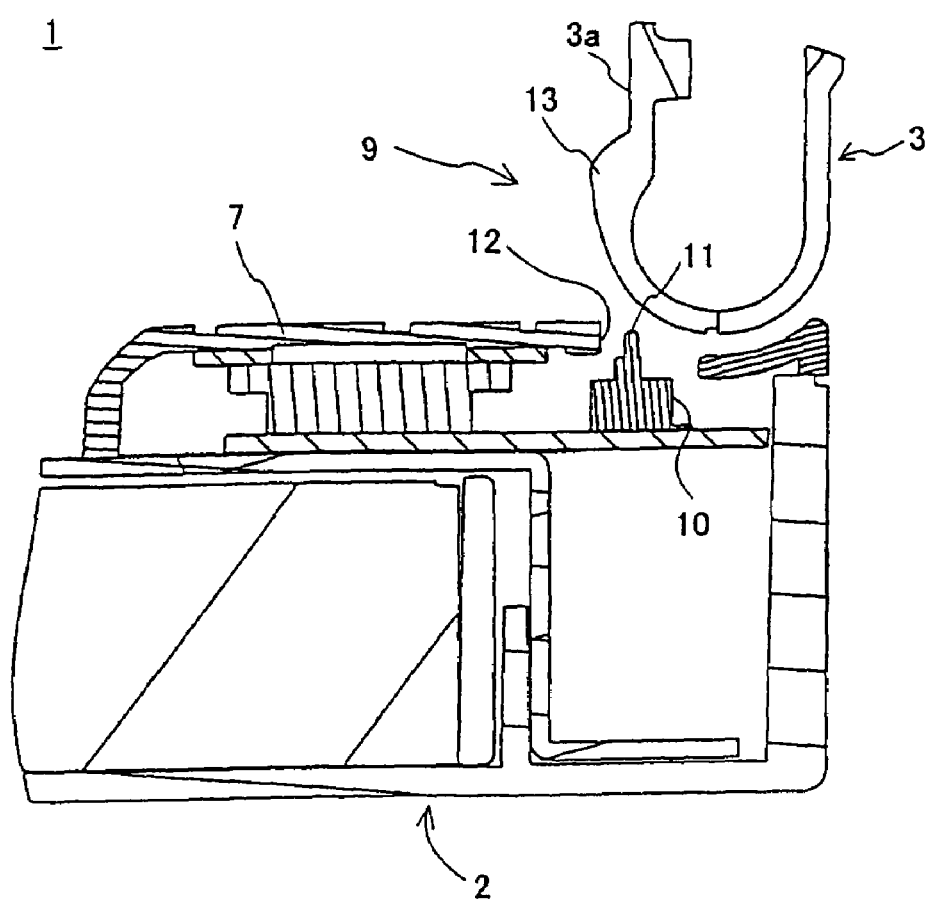
FIG. 2 is an enlarged cross sectional view of the detecting mechanism region of the data processing apparatus of the prior art.
Figure 3:
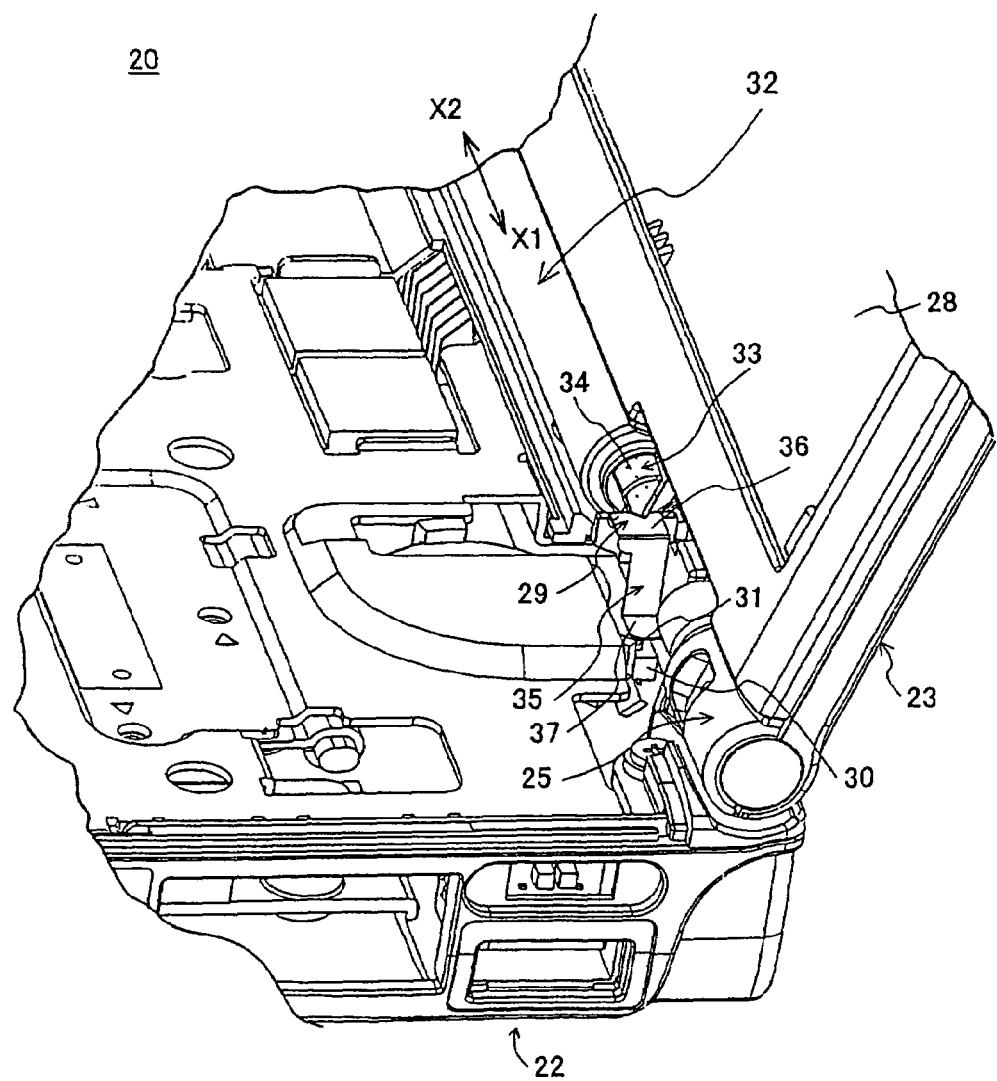
FIG. 3 is an enlarged perspective view of a detecting mechanism region of a data processing apparatus showing one embodiment of the present invention.
Figure 4:
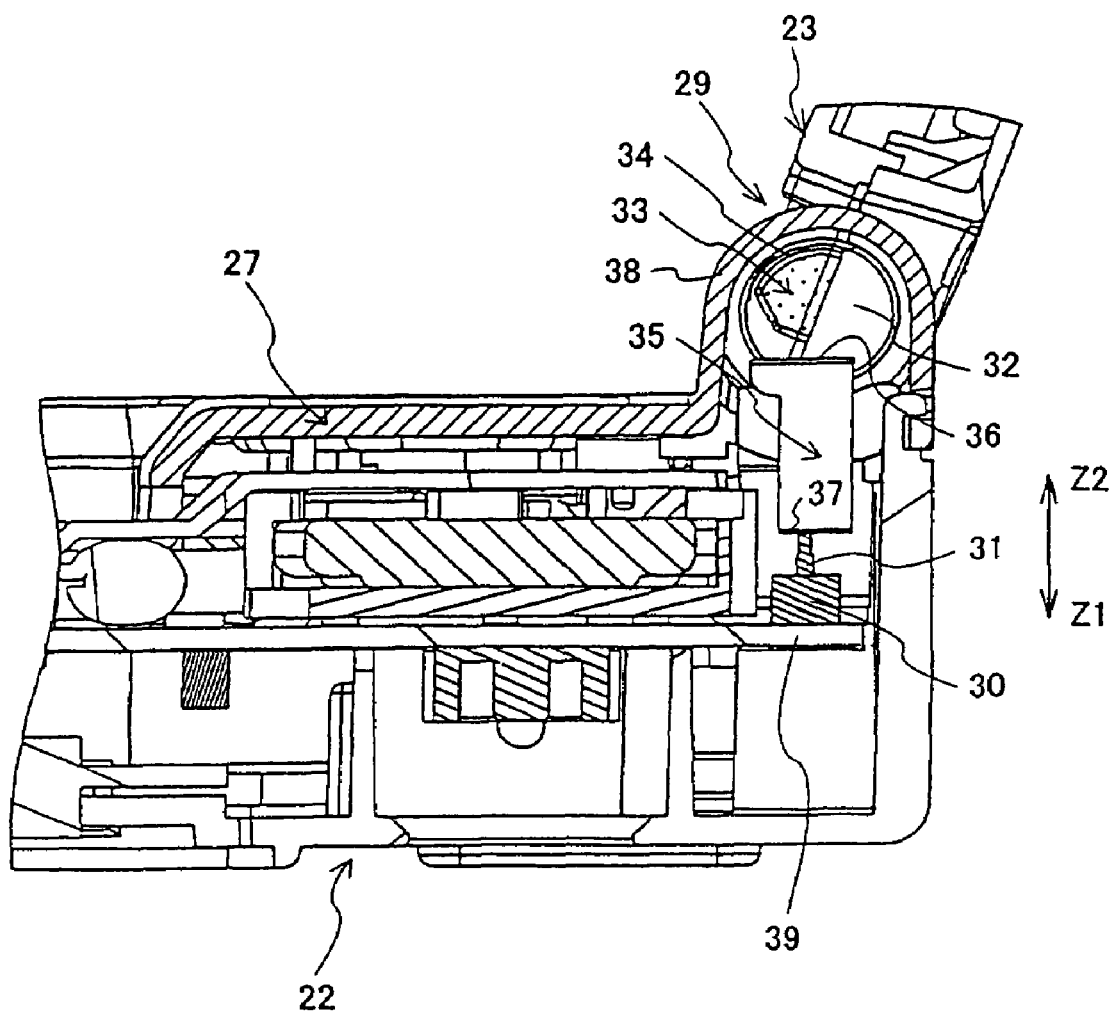
FIG. 4 is an enlarged cross sectional view of the detecting mechanism region of the data processing apparatus of the embodiment.
Figure 5:
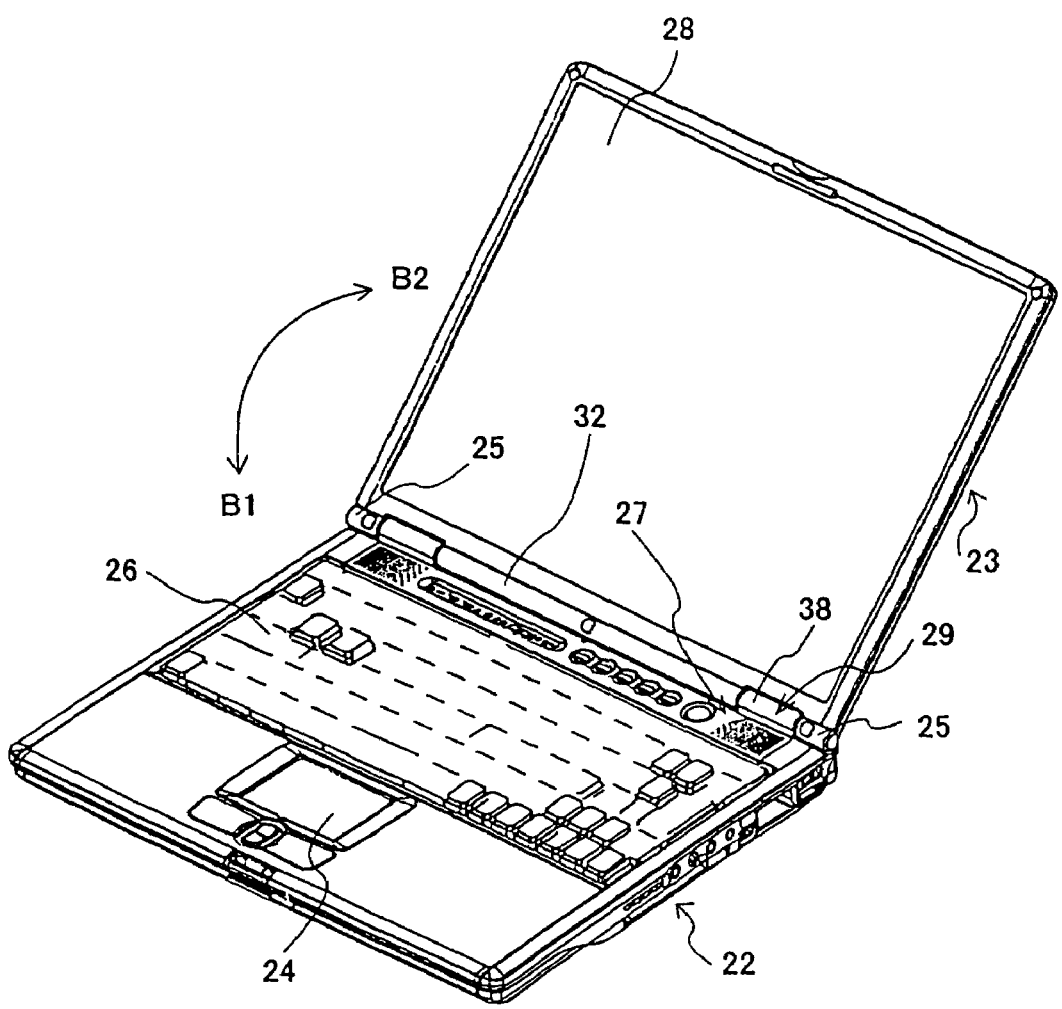
FIG. 5 is a perspective view showing an overall arrangement of the data processing apparatus of the embodiment.

Illustrated in FIGS. 3 through 5 is a data processing apparatus 20 according to one embodiment of the present invention. FIG. 3 is an enlarged perspective view showing substantially a detecting mechanism 29 in the data processing apparatus 20 (with a cover member 27 removed). FIG. 4 is an enlarged cross sectional view showing substantially the detecting mechanism 29 in the data processing apparatus 20. FIG. 5 is a perspective view showing an external appearance of the data processing apparatus 20. Throughout the drawings, a cover unit 23 is in its opened state.

As is apparent from FIG. 5, the data processing apparatus 20 of the embodiment is of a known lap-top type. The data processing apparatus 20 consists mainly of a main body 22 and the cover unit 23.

The main unit 22 includes a cursor operator 24, a keyboard 26, a set of circuit boards not shown (a CPU and other controllers), interfaces, and power sources. The cover unit 23 includes a liquid crystal display 28 or any other display.

In the portable mode, the cover unit 23 is closed in a direction denoted by the arrow B1 in FIG. 5 so that it overlaps the main body 22 for improved portability. When the data processing apparatus 20 is in use, its cover unit 23 is opened to such a position in a direction denoted by the arrow B2 in FIG. 5 so that the liquid crystal display 28 is favorably viewed.

The main body 22 and the cover unit 23 in the embodiment are joined at both ends to each other by a pair of hinges 25. This allows the cover unit 23 to rotate about the hinges 25 in both directions denoted by the arrows B1 and B2 in relation to the main body 22.

Also, the data processing apparatus 20 of the embodiment has the detecting mechanism 29 arranged for energy saving of the battery and improvement of the operability. The detecting mechanism 29 automatically disconnects the liquid crystal display 28 from its power supply when the cover unit 23 is closed over the main body 22 in the portable mode (not in use). When the cover unit 23 is opened to use the data processing apparatus 20, the detecting mechanism 29 automatically energizes the liquid crystal display 28.

The arrangement of the detecting mechanism 29 will now be explained in more detail referring to FIGS. 3 and 4.

The detecting mechanism 29 consists mainly of a detecting switch 30, a cam 33, and a lever 35. The detecting switch 30 is switched on and off by the action of its switching knob 31 and mounted on a circuit board 39 provided in the main body 22.

The circuit board 39 has a control circuit provided thereon for energizing and de-energizing the liquid crystal display 28. As the detecting switch 30 is mounted directly on the circuit board 39, its response can be increased. Also, the detecting switch 30 needs no extra wiring arrangement for connection with the circuit board 39. The circuit board 39 of the embodiment is located far away from the front side (the upper end in the drawing) of the main body 22.

The cam 33 is arranged integral with one end (along a direction denoted by the arrow X1 in FIG. 3) of a pivot shaft 32. The cam 33 is coaxial with the axis of pivotal movement of the pivot shaft 32. Also, the cam 33 is shaped where its maximum lifting stroke is smaller than the radius of the pivot shaft 32. More specifically, the cam 33 remains radially inward of the outer edge of the pivot shaft 32 when viewed from one side as best shown in FIG. 4.

The pivot shaft 32 with the cam 33 is arranged for pivotal movement together with the cover unit 23. This allows the cam 33 to turn when the cover unit 23 is moved about the pivot shaft 32. Accordingly, as the cover unit 23 is turned in the direction denoted by the arrow B1 in FIG. 5 for the closing movement, the cam 33 presses downwardly (in a direction denoted by the arrow Z1 in FIG. 4) with its actuating portion 34, where the lifting stroke becomes maximum, against the uppermost end 36 of the lever 35.

The lever 35 is made of a sheet spring material which is fixedly joined at one end (along a direction denoted by the arrow X2 in FIG. 3) to the main body 22. This allows the lever 35 to be supported in cantilever relationship.

The lever 35 is arranged of substantially a Z shape including an upper tab portion 36 and a lower tab portion 37. The upper tab portion 36 can be directly engaged with the actuating portion 34 of the cam 33. The lower tab portion 37 remains engaged with the switching knob 31 of the detecting switch 30.

When its upper tab portion 36 is depressed by the actuating portion 34 of the cam 33, the lever 35 elastically deforms in the direction denoted by the arrow Z1 in FIG. 4 and its lower tab portion 37 thus presses down the switching knob 31. More specifically, when the cover unit 23 is closed, the cam 33 actuates the detecting switch 30 via the lever 35. In response, the detecting switch 30 generates a signal output which thus indicates the closing movement of the cover unit 23.

The detecting mechanism 29 of the embodiment has the cam 33 mounted coaxially to the end (along the X1 direction) of the pivot shaft 32 for actuating the detecting switch 30. Particularly, the cam 33 is shaped to remain inwardly of the outer radial edge of the pivot shaft 32 when viewed from one side.

This requires no use of the opening provided in the main body 22 and the actuating member mounted on the inner wall of the cover unit 23 which are essential in the prior art. In other words, the cam 33 never moves out from the cross section of the pivot shaft 32 thus permitting the cover member 27 to shield the pivot shaft 32.

More specifically, the cover member 27 has a U shaped portion 38 thereof shown in the cross section of FIG. 4 for accommodating the cam 33. This allows the main body 22 to be protected from dust or dirt and the data processing apparatus 20 to be improved in the appearance.

Also, the detecting switch 30 in the embodiment is actuated by the action of the lever 35 but not directly by the cam 33. As a result, the cam 33 and the detecting switch 30 can be spaced apart from each other. More specifically, both the cam 33 and the detecting switch 30 can be placed with a higher degree of freedom.

Because the data processing apparatus 20 is minimized in thickness and size, the cam 33 and the detecting switch 30 may need to be placed separate from each other. According to the embodiment, the cam 33 and the detecting switch 30 can be placed with a higher degree of freedom, thus contributing to the reduction in the thickness and size of the data processing apparatus 20. In the case that the cam 33 and the detecting switch 30 are placed close to each other, the lever member 35 may be eliminated.

As explained, the cover member 27 is used for protecting the cam 33 in the embodiment. It is desirable that the cover member 27 be located close to the cover unit 23 over the main body 22.

The cover member 27 has the U shaped portion 38 provided for protecting the actuating portion 34 of the cam 33. This can successfully reduce the number of components and thus the overall cost of production as compared with the prior art where the cam 33 (in the detecting mechanism 29) is protected with another extra member in addition to the cover member 27. Also, as the cam 33 (in the detecting mechanism 29) is securely protected by the U shaped portion 38, it can be highly dust-proof.

The present invention is not limited to the embodiment that is described in the form of a laptop personal computer but may be applicable to any type of the data processing apparatus having a cover unit arranged openable in relation to a main body thereof (e.g. a portable DVD player or navigation system).

As set forth above, the present invention offers the following advantages.

The detecting switch can be actuated by the action of the cam provided at the axial end of the pivot shaft. This eliminates any need of an opening provided in the main body or an actuating portion provided on the inner wall of the cover unit, thus inhibiting dust or dirt from entering the main body and improving the appearance of the data processing apparatus.

The detecting switch can be placed with a higher degree of freedom.

The number of components and the overall cost of production can be decreased significantly as compared with the prior art arrangement where the detecting mechanism is protected with an extra member. Also, as the detecting mechanism is securely protected, it can be free from fouling with dust or dirt.

The display can be energized and de-energized dependably by the opening and closing action of the cover unit.

What is claimed is:

1. A data processing apparatus comprising:
   a main body having a device for data processing mounted therein;
   a cover unit pivotally mounted to the main body for opening and closing in relation to the main body; and
   a detecting mechanism for detecting the opening and closing of the cover unit, wherein
   the detecting mechanism includes:
   a pivot shaft formed as a part of the cover unit,
   a cam formed as part of the cover unit and coaxially rotating together with the pivot shaft that can rotate together with the cover unit,
   a detecting switch mounted to the main body and directly or indirectly actuated by the action of the cam as the cover unit opens and closes, thereby detecting the opening and closing of the cover unit.

2. The data processing apparatus according to claim 1, wherein a lever is provided between the cam and the detecting switch for transmitting a displacement of the cam to the detecting switch.

3. The data processing apparatus according to claim 1, wherein a cover member is provided on the main body for covering the detecting mechanism as well as internal components of the main body.

4. The data processing apparatus according to claim 1, wherein the detecting switch functions for energizing and de-energizing a display provided on the cover unit.

5. The data processing apparatus according to claim 4, wherein the cover unit includes the display.

6. The data processing apparatus according to claim 1, wherein the cover unit includes a display.

* * * * *